United States Patent
López López

(10) Patent No.: US 11,753,148 B2
(45) Date of Patent: Sep. 12, 2023

(54) LANDING GEAR DOOR SYSTEM AND OPERATION METHOD

(71) Applicant: Airbus Operations S.L., Getafe (ES)

(72) Inventor: Ladislao López López, Getafe (ES)

(73) Assignee: Airbus Operations S.L., Getafe (ES)

( * ) Notice: Subject to any disclaimer, the term of this patent is extended or adjusted under 35 U.S.C. 154(b) by 79 days.

(21) Appl. No.: 17/354,787

(22) Filed: Jun. 22, 2021

(65) Prior Publication Data

US 2021/0403145 A1 Dec. 30, 2021

(30) Foreign Application Priority Data

Jun. 24, 2020 (EP) .................................... 20382557

(51) Int. Cl.
*B64C 25/16* (2006.01)
*B64C 25/24* (2006.01)
*B64C 25/26* (2006.01)

(52) U.S. Cl.
CPC .............. *B64C 25/16* (2013.01); *B64C 25/24* (2013.01); *B64C 25/26* (2013.01)

(58) Field of Classification Search
CPC ......... B64C 25/16; B64C 25/18; B64C 25/24; B64C 25/26
See application file for complete search history.

(56) References Cited

U.S. PATENT DOCUMENTS

| 4,568,045 A * | 2/1986 | Mayer ..................... B64C 25/26 244/102 R |
| 2005/0230549 A1 | 10/2005 | White et al. |
| 2013/0075527 A1* | 3/2013 | Lecourtier .............. B64C 25/28 244/129.5 |
| 2015/0166173 A1 | 6/2015 | Reynes et al. |
| 2017/0166300 A1 | 6/2017 | Cros et al. |

FOREIGN PATENT DOCUMENTS

| EP | 2572981 A1 | 3/2013 |
| WO | 2004000502 A1 | 12/2003 |

OTHER PUBLICATIONS

European Search Report; priority document.

* cited by examiner

*Primary Examiner* — Philip J Bonzell
*Assistant Examiner* — Ashesh Dangol
(74) *Attorney, Agent, or Firm* — Greer, Burns & Crain, Ltd.

(57) ABSTRACT

A landing gear door system, including a landing gear bay including an opening and accommodating a landing gear in a retracted position, a landing gear door for opening and closing the opening, an actuator for operating the landing gear door between an open and a closed position, a lock located in the landing gear bay and latching the landing gear door in the closed position, a stop fitting located in the landing gear bay and configured to be in connection with the landing gear door at least in its latched position. The landing gear door system further includes an additional actuator configured to apply a force to the landing gear door in its closed position and to elastically deform the landing gear door towards the landing gear door bay.

15 Claims, 3 Drawing Sheets

LANDING GEAR DOOR SYSTEM AND OPERATION METHOD

CROSS-REFERENCES TO RELATED APPLICATIONS

This application claims the benefit of the European patent application No. 20382557.5 filed on Jun. 24, 2020, the entire disclosures of which are incorporated herein by way of reference.

FIELD OF THE INVENTION

The present invention relates to a landing gear door system and its operation method. The landing gear door system and operation method of this invention help to mitigate peak loads produced at the landing gear door.

BACKGROUND OF THE INVENTION

During flights, landing gears are retracted in landing gear bays which are closed by landing gear doors. The doors are hydraulically operated by an actuator. The doors are closed after extension/retraction of the gears and are pulled into contact with stops mounted on the belly fairing.

In the closed position of the landing gear doors, the landing gear cannot be deployed from the landing gear bay, as the landing gear door covers the opening to impede its deployment. In the open position of the landing gear door, the landing gear can be deployed from the landing gear bay.

The landing gear doors are maintained in this position by an up-lock, i.e., a lock that latches the landing gear door in the upright or closed position. The up-lock is mounted on the belly fairing structure of the landing gear bay.

The main landing gear doors are pre-crushed in order to maintain contact with the stop fitting in the case of aerodynamic pressure tending to open the door.

Crush means that the landing gear door is forced inwards, i.e., against or towards the landing gear bay, by applying a force to the door. Thus, the landing gear door is elastically deformed towards the landing gear door bay. Elastically means that the door is capable of recovering its shape after the deformation.

The crush or smash is performed before locking of the door, thus the door is pre-crushed before locking the door.

A known landing gear door comprises a distal end, a proximal end and a hinge line located between the distal and the proximal end. The actuator contacts the landing gear door at its proximal end, so that when the actuator is operated, the landing gear door is pivotably moved around the hinge line.

A known closing operation of a landing gear door system comprises the following steps:

1. The actuator pushes the proximal end of the door in a direction opposite to the landing gear bay so that the door rotates around the hinge line.
2. The door reaches the stop fitting.
3. The actuator increases the load applied to the landing gear door to perform its pre-crushing. As previously stated, the increase of the applied load causes peak loads that may cause problems.
4. The up-lock is latched when the door reaches the pre-crushed condition.
5. The actuator is depressurized.

SUMMARY OF THE INVENTION

An object of the present invention is a landing gear door system, comprising:

A landing gear bay configured to accommodate the landing gear in a retracted position. The landing gear bay comprises an opening for the landing gear to be deployed from the landing gear bay.

A landing gear door configured to open and close the opening of the landing gear bay. The landing gear bay is closed by the door when the landing gear door is located over the opening in its upright position, i.e., it lays over the opening. The door is considered open in any position other than closed.

An actuator attached to the landing gear bay and connected to the landing gear door for operating the landing gear door between the open and the closed position.

A lock located in the landing gear bay and configured to latch the landing gear door in the closed position.

A stop fitting located in the landing gear bay and configured to be in connection with the landing gear door at least in its latched position.

An additional actuator configured to apply a force to the landing gear door in its closed position and to elastically deform the landing gear door towards the landing gear door bay.

Thus, the invention adds an additional actuator that crushes the door instead of the actuator that is configured to open and close the door performing that task.

The additional actuator may be connected to the landing gear door bay, i.e., it can be directly attached to the landing gear door bay or it can be attached through an intermediate element located between the additional actuator and the landing gear door bay.

The additional actuator is also connected to the landing gear door in its closed position, i.e., it can be directly in contact with the landing gear door or it can be attached to an intermediate element located between the additional actuator and the landing gear door.

The claimed invention reduces the structural problems related to the peak loads generated by the actuator of the landing gear door to accomplish the requirement of the crushing of the door.

The landing gear door, the surrounding structure of the belly fairing and the actuator are dimensioned according to these peak loads. The mitigation of these loads is achieved by transferring the responsibility of crushing the door from the actuator to the additional actuator. Thus, the main actuator rotates the door and the crushing operation is done locally by the additional actuator.

As a result, the additional actuator may be a smaller actuator. Thus, the optimization of the structure and the reduction of the actuator size are advantages achieved by the claimed invention.

The operation of the door remains unchanged as the door reaches the same latched position as the state-of-the-art system. When the door is in a latched position, the door contacts the stop fitting and it is crushed. Due to the reduction of loads, this invention can even lead to a full electric door operation.

Also an object of the invention is the landing gear door system operation method comprising the following steps in the closing operation:

driving the actuator such that the landing gear door is moved from the open position to the closed position, driving the additional actuator for applying a force to the landing gear door in its closed position and for elastically deforming the landing gear door towards the landing gear door bay.

BRIEF DESCRIPTION OF THE DRAWINGS

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE PREFERRED EMBODIMENTS

Figure 1:
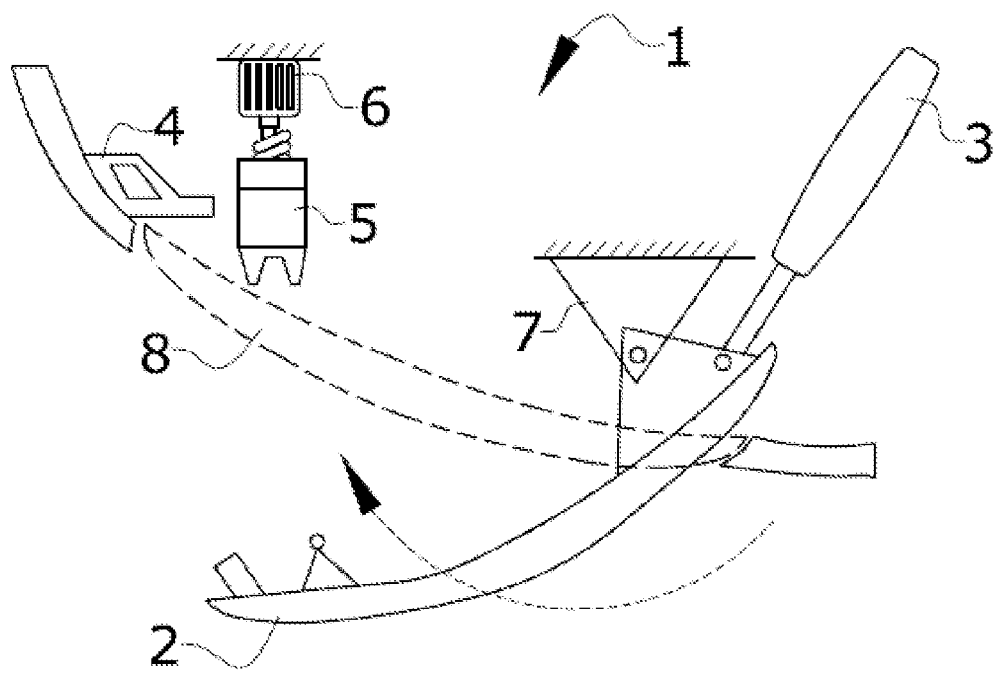
FIGS. 1 to 5 show schematic lateral views of a closing sequence of a landing door system according to an embodiment of the invention.

FIGS. 1 to 7 disclose a landing gear door system comprising:

A landing gear bay (1) for accommodating the landing gear in a retracted position (not represented).

A landing gear door (2) that closes the landing gear bay opening (8) comprising a distal end (2.1), a proximal end (2.2) and a hinge line (2.3) located between the distal end (2.1) and the proximal end (2.2). The proximal end (2.2) is located in the proximity of the hinge line (2.3) of the landing gear door (2) and the distal end (2.1) is the opposite end of the door (2).

An actuator (3) attached to the landing gear bay (1) and connected to the landing gear door (2) for operating the landing gear door (2) between the open and the closed position. The actuators (6, 16) may be hydraulically or pneumatically actuated. In the shown embodiments, the actuator (3) is being connected to the landing gear door (2) in the proximity of the proximal end (2.2).

A lock (5) located in the landing gear bay (1) and configured to latch the landing gear door (2) in the closed position.

A stop fitting (4) located in the landing gear bay (1) and configured to be in connection with the landing gear door (2) at least in its latched position.

The additional actuators (6, 16) are configured to apply a force to the landing gear door (2) in its closed position and to elastically deform the landing gear door (2) towards the landing gear door bay (1).

In the shown figures, the additional actuators (6, 16) are in connection with the landing gear bay (1). The additional actuators (6, 16) may be attached to the landing gear bay (1) or to an element which is attached to the landing gear bay (1).

Figure 2:
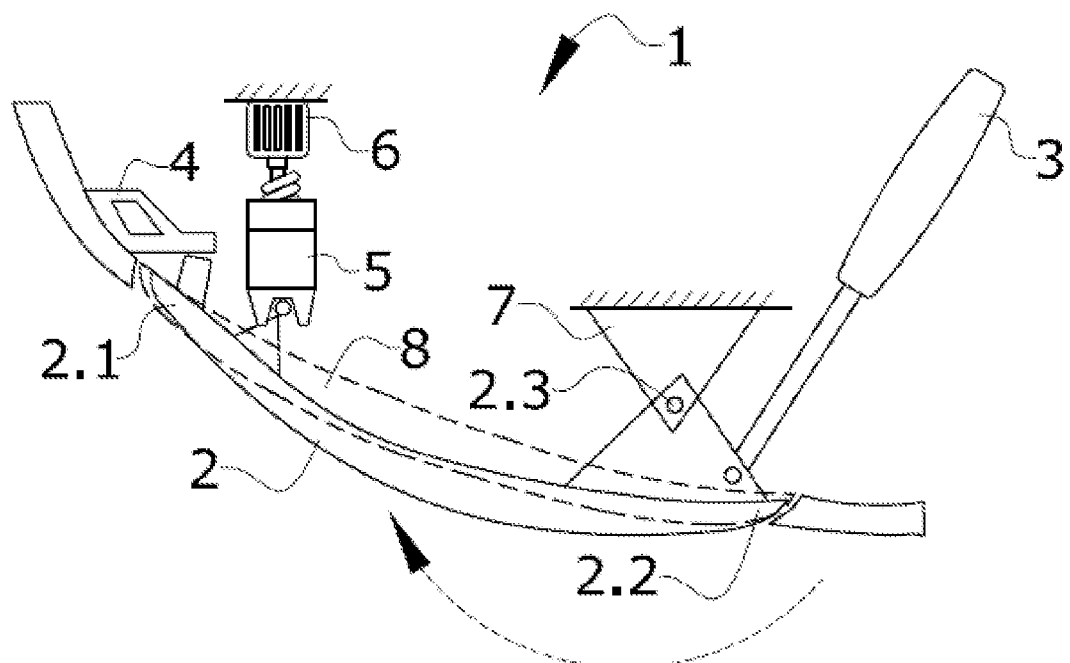
Figure 3:
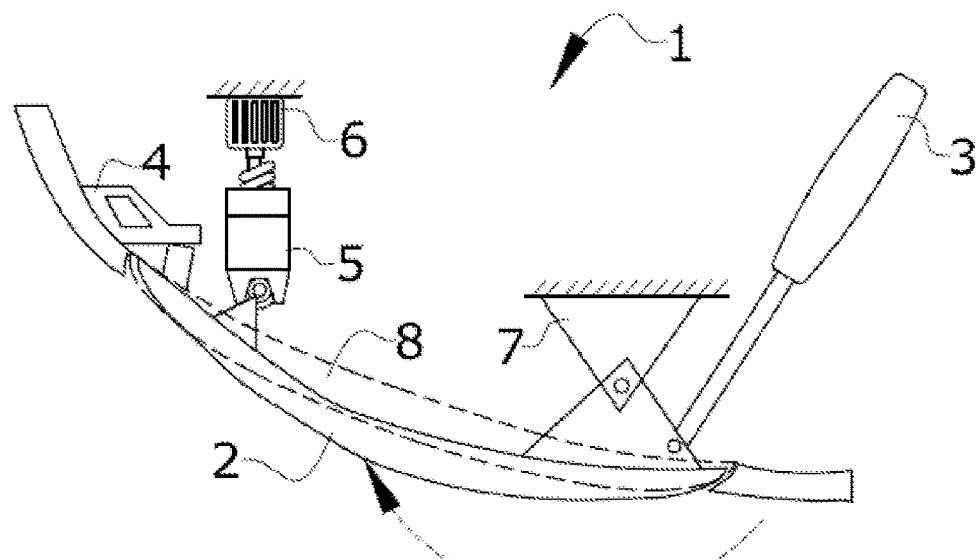
Figure 4:
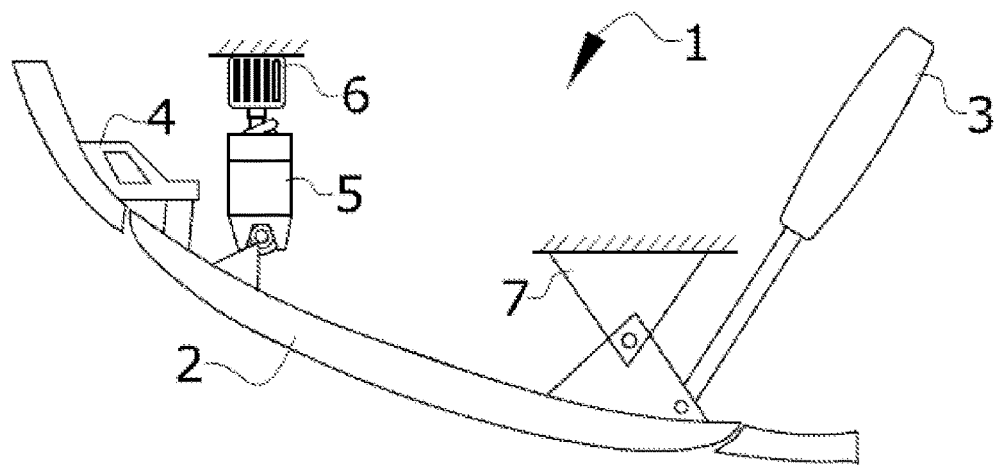
Figure 5:
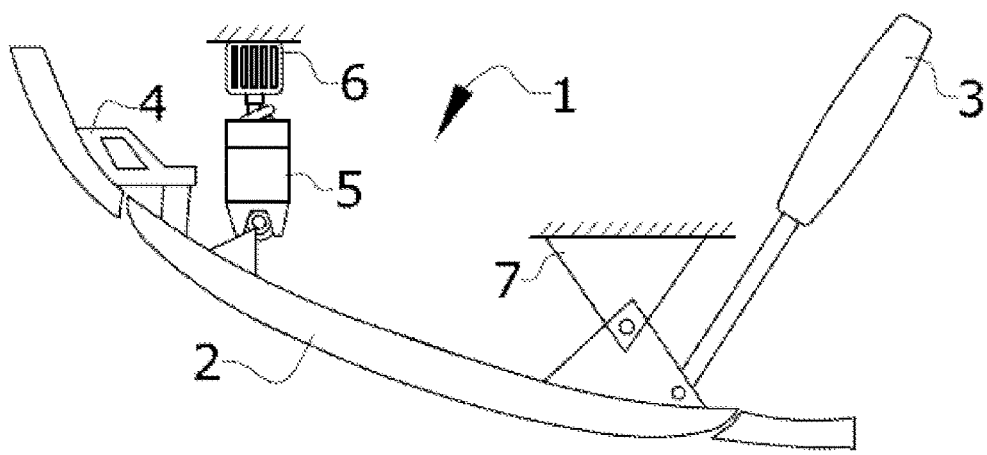

In the embodiment shown in FIGS. 1 to 5, a closing sequence is depicted. FIG. 1 discloses the open landing gear door (2). In FIG. 2 the landing gear door (2) is closed and comes into contact with the lock (5). In FIG. 3 the landing gear door (2) is latched to the lock (5). In FIG. 4 the landing gear door (2) is crushed against the landing gear bay (1) by the applied force and comes into contact with the stop fitting (4) and in FIG. 5 the landing gear door (2) is fully closed and latched.

In the shown embodiment the landing gear door (2) is concave with respect the landing gear bay (1). As stated, the additional actuators (6, 16) are configured to elastically deform the landing gear door (2). For the shown landing gear door (2) it means that the concave door is flattened towards the landing gear door bay (1).

Thus, the landing gear door (2) covers the entire opening (8) of the landing gear door bay (1) preventing air from entering the landing gear door bay (1) that may push the door outwardly or cause the door (2) to vibrate. Additionally, as the landing gear door (2) is stressed by the applied force and the deformation, it counteracts the forces of the incoming air. Moreover, the landing gear door (2) in its elastically deformed position, aerodynamically smooths the outer surface of the landing gear door bay.

In both embodiments, the additional actuators (6, 16) are configured to apply a force to the landing gear door (2) once the lock (5) latches to the landing gear door (2).

The present invention will reduce the closing failures that the in-service experience has revealed. Sometimes the actuator (3) cannot overcome the crushing forces so the lock (5) cannot be latched, leading to a "non-latched door" condition that may force the aircraft to return to the base. It ensures that the landing gear door (2) always reaches the lock (5) as there is no crushing forces to be exerted before the lock (5) is latched.

In the embodiment shown in FIGS. 1 to 5 and 7 the additional actuator (6) is configured to pull the landing gear door (2) towards the landing gear door bay (1) to elastically deform the landing gear door (2) towards the landing gear door bay (1).

More specifically, the additional actuator (6) is configured to pull the lock (5) once the lock (5) latches the landing gear door (2).

Moreover, the additional actuator (6) is attached to the lock (5). The additional actuator (6) is also attached to the landing gear bay (1).

Thus, the additional actuator (6) pulls the lock (5) and applies a force to the landing gear door (2) once the landing gear door (2) is latched to the lock (5). The additional actuator (6) is adapted to pull the lock (5) and the lock (5) is configured to pull the landing gear door (2) elastically deforming it towards the landing gear door bay (1) as it is shown in FIG. 4.

As the displacement of the lock (5) is of the order of few millimeters, the additional actuator (6) can be a pulling device such as an endless screw than can produce enough force to crush the landing gear door (2) against the landing gear bay (1).

Figure 6:
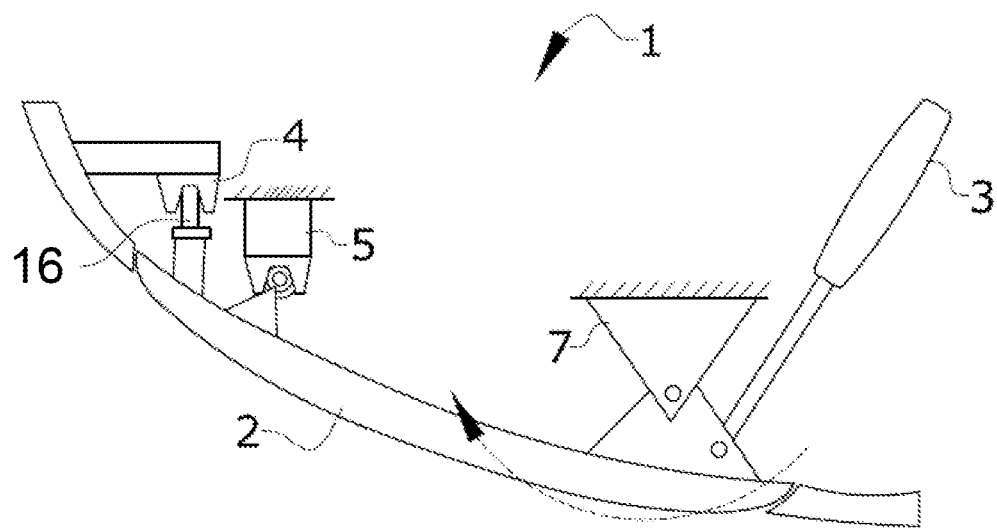
FIG. 6 shows a schematic lateral view of a second embodiment of the invention.

In FIG. 6 another embodiment of the invention is shown.

In both embodiments, the actuator (3) is connected to the landing gear door (2) in the proximity of the proximal end (2.2) and the additional actuator (6) is configured to be connected to the landing gear door (2) in the proximity of the distal end (2.1). Thus, the actuator (3) and the additional actuator (6) contact the landing gear door (2) far away along the door.

In FIG. 6, the additional actuator (16) is configured to:
contact the landing gear door (2) in the closed position in the proximity of the distal end (2.1), and
push the landing gear door (2) in a direction opposite to the landing gear bay (1) and elastically deform the landing gear door (2) towards the landing gear door bay (1).

Thus, in this embodiment, the additional actuator (16) is configured to push the landing gear door (2) from its distal end (2.1).

In the embodiment shown in FIG. 6, to perform the crushing operation, the landing gear door (2) is pushed by the additional actuator (16) from the door stop fitting (4), instead of pulling from the lock (5).

In both embodiments a force is applied to the landing gear door (2), the force results in the landing gear door (2) being deformed towards the landing gear door bay (1). The deformation against the landing gear door (2) is achieved pulling the landing gear door (2) or pushing the landing gear door (2) depending on where the force is applied in the door (2).

More particularly, the hinge line (2.3) of the landing gear door (2) and the lock (5) are located between the actuator (3) and the additional actuators (6, 16). The hinge line (2.3) is located in the proximity of the actuator (3) and the lock (5) is located in the proximity of the additional actuators (6, 16).

As stated, in the shown embodiment, the additional actuator (16) is attached to the stop fitting (4).

Additionally, the stop fitting (4) is configured to contact the landing gear door (2) in a position closer to the distal end (2.1) than the position in which the lock (5) is configured to contact the landing gear door (2).

In the state of the art, high loads are necessary because the application point of the actuator (3) is very close to the hinge line (2.3) which is located in a hinge fitting (7) while the door stop fitting (4) and the lock (5) are far from the actuator (3).

Figure 7:
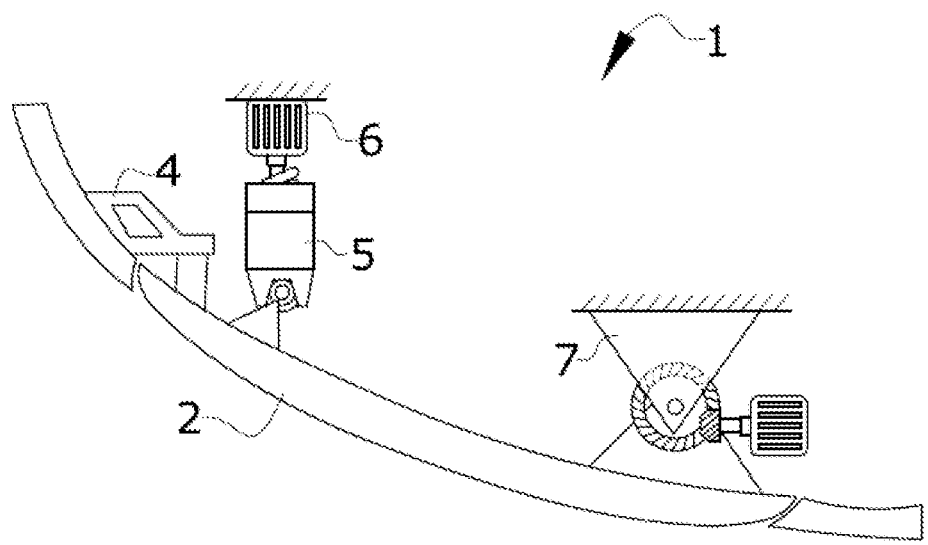
FIG. 7 shows a schematic lateral view of an electric landing door system according to the embodiment of FIGS. 1 to 5.

In the embodiment of FIG. 7, the actuator (3) is electrically actuated.

Additionally, the additional actuator (6) is also electrically actuated.

The landing gear door system operation method of the shown embodiments comprises the following steps for the closing operation of the landing gear door (2):

driving the actuator (3) such that the landing gear door (2) is moved from the open position to the closed position, driving the additional actuators (6, 16) for applying a force to the landing gear door (2) in its closed position and for elastically deforming the landing gear door (2) towards the landing gear door bay (1).

As stated, in both embodiments before the additional actuators (6, 16) pulls or pushes the landing gear door (2), the lock (5) latches to the landing gear door (2) in the closed position.

In the embodiment of FIGS. 1 to 5, when the additional actuator (6) is driven, it pulls the landing gear door (2) towards the landing gear bay (1).

In the shown embodiment, the additional actuator (6) is attached to the lock (5), and the lock (5) pulls the landing gear door (2).

Finally, the actuators (6, 16) are depressurized when the landing gear door (2) is latched.

In the embodiment of FIG. 6, the step of driving the additional actuator (16) comprises the step of the additional actuator (16) pushing the landing gear door (2) in a direction opposite to the landing gear bay (1).

More particularly, the step of the additional actuator (16) pushing the landing gear door (2) comprises the step of the landing gear door (2) contacting the additional actuator (16) in the closed position which is located in the stop fitting (4).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing gear door system, comprising:
   a landing gear bay accommodating a landing gear in a retracted position, the landing gear bay comprising an opening for the landing gear to be deployed from the landing gear bay,
   a landing gear door movable to open and close the opening of the landing gear bay,
   an actuator attached to the landing gear bay and connected to the landing gear door to operate the landing gear door between an open position and a closed position,
   a lock located in the landing gear bay, the lock latching the landing gear door in the closed position,
   a stop fitting located in the landing gear bay and in connection with the landing gear door at least in its latched position, and,
   an additional actuator applying a pulling force to the landing gear door in the closed position which elastically deforms the landing gear door towards the landing gear door bay.

2. The landing gear door system, according to claim 1, wherein the additional actuator is configured to apply a force to the landing gear door once the lock latches to the landing gear door.

3. The landing gear door system, according to claim 1, wherein the additional actuator is configured to pull the landing gear door towards the landing gear door bay.

4. The landing gear door system, according to claim 3, wherein the additional actuator is attached to the lock and configured to pull the lock such that the lock pulls the landing gear door.

5. The landing gear door system, according to claim 1, wherein the landing gear door comprises a distal end and a proximal end, the actuator being attached to the landing gear bay and being connected to the landing gear door in a proximity of the proximal end and the additional actuator being further configured to:
   contact the landing gear door in the closed position in the proximity of the distal end, and
   push the landing gear door in a direction opposite to the landing gear bay.

6. The landing gear door system, according to claim 5, wherein the landing gear door comprises a hinge line, the hinge line and the lock being located between the actuator and the additional actuator, the hinge line being located in a proximity of the actuator and the lock being located in a proximity of the additional actuator.

7. The landing gear door system, according to claim 5, wherein the additional actuator is attached to the stop fitting.

8. The landing gear door system, according to claim 1, wherein the landing gear door is concave with respect the landing gear bay and the additional actuator is configured to flatten the landing gear door towards the landing gear door bay.

9. The landing gear door system, according to claim 1, wherein at least one of the actuator or the additional actuator are electrically actuated.

10. A landing gear door system operation method, the landing gear door system being according to claim 1, and the method, for a closing operation of the landing gear door, comprising:
    driving the actuator such that the landing gear door is moved from the open position to the closed position, and driving the additional actuator for applying a force to the landing gear door in the closed position and for elastically deforming the landing gear door towards the landing gear door bay.

11. The landing gear door system operation method, according to claim 10, wherein the lock latches the landing gear door before the additional actuator applies the force to the landing gear door.

12. The landing gear door system operation method, according to claim 10, wherein in the driving the additional actuator, the additional actuator pulls the landing gear door towards the landing gear bay.

13. The landing gear door system operation method, according to claim 12, wherein the additional actuator pulls the lock and the lock pulls the landing gear door.

14. The landing gear door system operation method, according to claim 10, wherein the landing gear door comprises a distal end and a proximal end, the actuator being attached to the landing gear bay being connected to the landing gear door in a proximity of the proximal end and the additional actuator contacting the landing gear door in the closed position in a proximity of the distal end, the driving the additional actuator comprising the additional actuator pushing the landing gear door in a direction opposite to the landing gear bay.

15. The landing gear door system operation method, according to claim 14, wherein the additional actuator pushing the landing gear door comprises the landing gear door contacting the additional actuator which is located in the stop fitting.

\* \* \* \* \*